(12) United States Patent
Shu

(10) Patent No.: US 7,603,320 B1
(45) Date of Patent: Oct. 13, 2009

(54) METHOD AND SYSTEM FOR PROTECTING SENSITIVE INFORMATION AND PREVENTING UNAUTHORIZED USE OF IDENTITY INFORMATION

(76) Inventor: Lingyan Shu, 4017 Richland Ave., Metairie, LA (US) 70002

( * ) Notice: Subject to any disclaimer, the term of this patent is extended or adjusted under 35 U.S.C. 154(b) by 0 days.

(21) Appl. No.: 10/653,846

(22) Filed: Sep. 2, 2003

Related U.S. Application Data

(60) Provisional application No. 60/407,540, filed on Aug. 31, 2002.

(51) Int. Cl.
*G06Q 20/00* (2006.01)
(52) U.S. Cl. .......................... 705/64; 705/16
(58) Field of Classification Search .................. None
See application file for complete search history.

(56) References Cited

U.S. PATENT DOCUMENTS

| | | | | |
|---|---|---|---|---|
| 4,630,201 A | * | 12/1986 | White ........................... | 705/44 |
| 5,329,589 A | * | 7/1994 | Fraser et al. ............. | 379/91.02 |
| 5,367,148 A | * | 11/1994 | Storch et al. ................ | 235/375 |
| 5,432,506 A | * | 7/1995 | Chapman .................... | 705/44 |
| 5,485,510 A | | 1/1996 | Colbert | |
| 5,553,145 A | | 9/1996 | Micali | |
| 5,689,799 A | | 11/1997 | Dougherty et al. | |
| 5,883,810 A | | 3/1999 | Franklin et al. | |
| 5,884,272 A | | 3/1999 | Walker et al. | |
| 5,890,137 A | | 3/1999 | Koreeda | |
| 6,006,200 A | * | 12/1999 | Boies et al. .................... | 705/26 |
| 6,029,890 A | | 2/2000 | Austin | |
| 6,163,771 A | | 12/2000 | Walker et al. | |
| 6,327,578 B1 | * | 12/2001 | Linehan ....................... | 705/65 |
| 6,422,462 B1 | | 7/2002 | Cohen | |
| 6,636,833 B1 | * | 10/2003 | Flitcroft et al. ................ | 705/1 |
| 6,766,301 B1 | * | 7/2004 | Daniel et al. .................. | 705/14 |
| 6,901,387 B2 | | 5/2005 | Wells et al. | |
| 2002/0133414 A1 | * | 9/2002 | Pradhan et al. ............... | 705/26 |
| 2002/0174030 A1 | * | 11/2002 | Praisner et al. .............. | 705/26 |
| 2003/0028481 A1 | * | 2/2003 | Flitcroft et al. ............... | 705/39 |

OTHER PUBLICATIONS

Virtual Credit Card (VCC), http://www.geocities.com/Eureka/Park/5014/vcc.htm, Jo Seau, Aug. 9, 1998.*

* cited by examiner

*Primary Examiner*—Evens J. Augustin
*Assistant Examiner*—Nancy T Le

(57) ABSTRACT

This invention features a method and system for protecting sensitive information from being disclosed and preventing unauthorized use of identity information by third parties. Virtual identifiers that identify an information holder whose sensitive information is involved in the process currently, are dynamically created by an entity called processing entity. The virtual identifiers are usually linked to a static identity of the information holder through a data management mechanism, such as a database system. A virtual identifier could serve for multiple functions. Usually, validity attributes that indicate when and for how long a virtual identifier is valid for the different functions, are associated with the virtual identifier. When an information holder interacts with a third party in a process that involves the information holder's sensitive information currently, the information holder uses a virtual identifier. Then, through a device connected to a network including wireless devices, telephone, a mail service, or direct human communication, the third party either passes along the virtual identifier to other parties or submits requests along with the virtual identifier to the processing entity which could map the virtual identifier to the static identity information and uses the static information to realize the requests.

18 Claims, 10 Drawing Sheets

METHOD AND SYSTEM FOR PROTECTING SENSITIVE INFORMATION AND PREVENTING UNAUTHORIZED USE OF IDENTITY INFORMATION

CROSS-REFERENCE TO RELATED APPLICATION

This application claims the benefit of Provisional Patent Application Ser. No. 60/407,540 filed 2002 Aug. 31.

FIELD OF THE INVENTION

This invention relates generally to methods and systems for protecting sensitive information, particularly identity information from being disclosed, collected, mismanaged, or misused during transactions that involve multiple parties.

BACKGROUND OF THE INVENTION

Currently, the extensive and unprotected use of one's identity information makes it very hard to prevent such identity information from being collected, misused or mismanaged. For example, people are required to disclose their social security numbers and dates of birth to landlords when applying for renting a property, to disclose the same information to loan officers when applying for loans, to disclose the information to service representatives when applying for cellular phone services, etc. One needs to disclose his/her credit card information to the person on the other end of the telephone line when making a hotel reservation or when reserving a rental boat. When shopping on-line or off-line with credit cards, credit card numbers along with other personal information need to be disclosed. People have no control over how the disclosed information will be managed and used. Even worse, people are vulnerable to information collection attacks. People are sent credit card application invitations with good offers. All they need to do to apply for a credit card is to fill in their social security numbers, dates of birth and other personal information. Yet, these invitations may come from an entity that is trying to collect personal information. Because of the unprotected and extensive use of identity information, identity theft has become a serious problem that can affect anyone. Another problem with the extensive use of sensitive information is that people can lose privacy without even knowing it. Vendors can collect an individual's shopping lists and use them to get other information about the individual. Also, the more one uses his/her sensitive information over the transmission media, the more susceptible the information is to being intercepted and collected.

In U.S. Pat. No. 5,884,272, a method and system for establishing anonymous communications between two parties are described. In this prior art, a central database is used to store the two parties' identities and data, as well as the rules for releasing the data. The two parties could get each other's information without having to disclose its own identity. This prior art is for establishing anonymous communications between only two parties and requires that the data and/or information sources related to both parties be centralized.

In U.S. Pat. No. 6,029,890, a user-specified credit card system is described. In this prior art, a central bank control system is used to transmit a user's request for a one-time credit card number to a credit provider and transmit back a one-time credit card number from the credit provider after the request is validated by the credit provider. This prior art would achieve the object of not giving out a static credit card number to the vendors. However, it requires a fairly large amount of changes to the current financial networks, including credit card approval and ATM networks to implement the central bank control system in this prior art. It also requires changes to each credit provider's business processes at a low level which is more difficult than making changes at a higher level. Therefore, it is costly and not easy to implement this prior art. In another prior art, U.S. Pat. No. 5,890,137, a method of credit card payment settlement in an on-line shopping system is described. In this method, a service center sends order data including the credit card information via a settlement network. The approval center pays the price to the service center. Then, service center sends the order information to the shopping system. This way the credit card information is not transmitted in public networks, such as the Internet. This prior art too, requires a large amount of changes to the existing business processes. In another prior art, U.S. Publication No. 2001/0044787, an electronic secure private agent is used to help conducting anonymous secure electronic transactions. In this prior art, the secure private agent mediates communication between the consumer and electronic commerce sites and monitors Internet browsing activities of the consumer, which is not desirable as the consumer and the commerce site may not want the transactions being monitored by a third party. Also this prior art cannot be used for offline transactions.

OBJECTS OF THE INVENTION

It is an object of the present invention to obviate the disadvantages of the prior art; It is an object of the present invention to provide a method and system for preventing sensitive information from being disclosed to certain parties, especially the parties whose credibility is uncertain, during transaction processes that involve multiple parties; It is an object of the present invention to provide a method and system for preventing unauthorized use of ones identity by a third party; It is a further object to make it easy and cost-effective for the current business processes to adapt to the present invention.

SUMMARY OF THE INVENTION

An embodiment of the present invention provides a method and system for protecting sensitive information, more particularly identity information during multi-party transaction processes. This method prevents sensitive information from being disclosed to certain parties, especially the parties whose credibility is uncertain. This method provides a way to prevent sensitive information from being collected illegally or being collected and used without authorization, which includes misuses of authorizations that were meant for other purposes or occasions. An entity called processing entity creates virtual identifiers for an information holder whose sensitive information is involved in the process. A virtual identifier identifies an information holder and is usually temporary and has validity attributes. It usually maps to a static identity of the information holder. The processing entity stores information about the virtual identifiers. Usually, the virtual identifiers are issued to the information holder. The information holder uses a virtual identifier when interacting with third parties. The third parties also use the virtual identifiers when interacting with other parties concerning the information holder. Such a system comprises a processing entity equipped with a computer system whose components include a data management system, a communication component and a plurality of user interfaces; and a plurality of mediums, such as a check book, and a coupon book, that carries virtual identifiers.

This method eliminates the necessity of disclosing sensitive information, particularly identity information, to parties whose credibility is uncertain. Furthermore, this method greatly reduces the needs of using one's static identity information in the processes that are prone to eavesdropping and interception, such as Internet transactions, telephone transactions and mail transactions. This method allows for one-time or multiple-time identification, therefore the virtual identifiers can serve the different functions the static identifiers serve currently and effectively protects the information holder from identity collection attacks and identity theft attacks. Yet, this method is easy to implement and does not require fundamental changes to the current business processes.

DETAILED DESCRIPTION OF THE INVENTION

The following terms are used in the description of this invention.

Information destination—entity that has to use the information directly to serve its function.

Non-information-destination—entity that uses the information indirectly to serve its function.

Information holder—entity whose sensitive information is needed in the processes that involve multiple parties.

Information source—entity that has sensitive information of an information holder. An information destination and an information source can be the same entity.

Virtual identifier—A virtual identifier comprises information that identifies an information holder. A virtual identifier usually corresponds to a static identity of an information holder. It is usually valid for a stated period of time for each of its specified functions. It can be valid for a one-time use or for multiple-time uses. A possible virtual identifier string comprises a field that identifies the information holder, a field that indicates an information source and a field of a randomly generated string.

Processing entity—entity that creates, manages and processes virtual identifiers. A processing entity, an information destination and an information source can be the same entity.

Where indicated, these terms are used interchangeably with some other terms through out the Specification.

Figure 1:
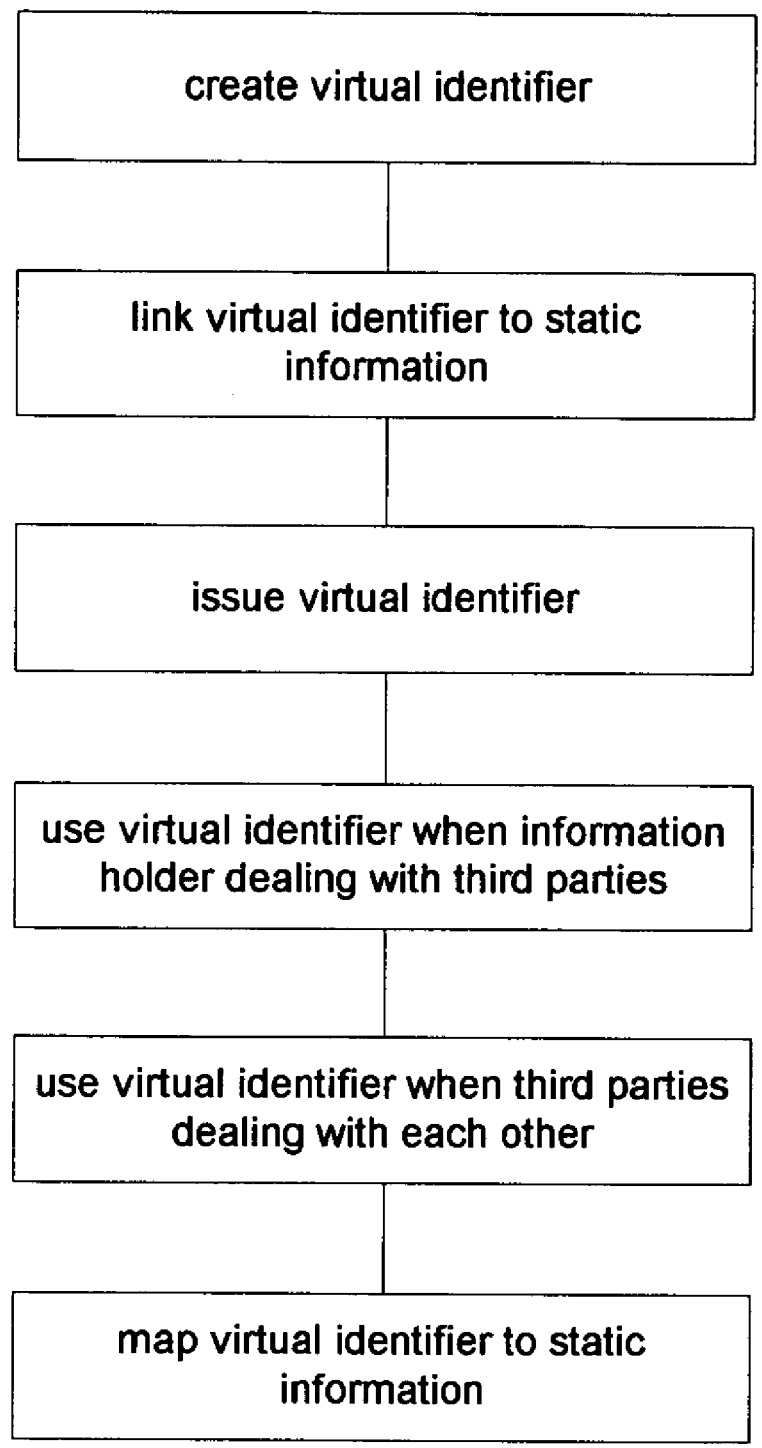
FIG. 1 is a block diagram illustrating the steps of the first embodiment described in the DETAILED DESCRIPTION.

FIG. 1 is a block diagram illustrating the general steps of an embodiment of this invention. A processing entity creates virtual identifiers for an information holder. The processing entity links the virtual identifiers to the static information of the information holder, through a data management mechanism such as database tables. The processing entity links other related information, such as the validity attributes of a virtual identifier, to the virtual identifier, usually through a data management mechanism or through adding the validity attributes to the virtual identifier string. Virtual identifiers are used when the information holder deals with third parties, particularly non-information-destination entities. The third parties use the virtual identifiers when dealing with each other concerning the information holder. At certain point of the process, virtual identifiers are mapped to the static information through a data management technique, such as a database query. Static sensitive information, particularly static identity information is not circulated in the process. Consequently, the static information is protected against collection and fraud. A variant of this embodiment is to add the following step:

update the virtual identifier's identifier's validity attributes. For example, marking the virtual identifier as invalid.

Figure 2:
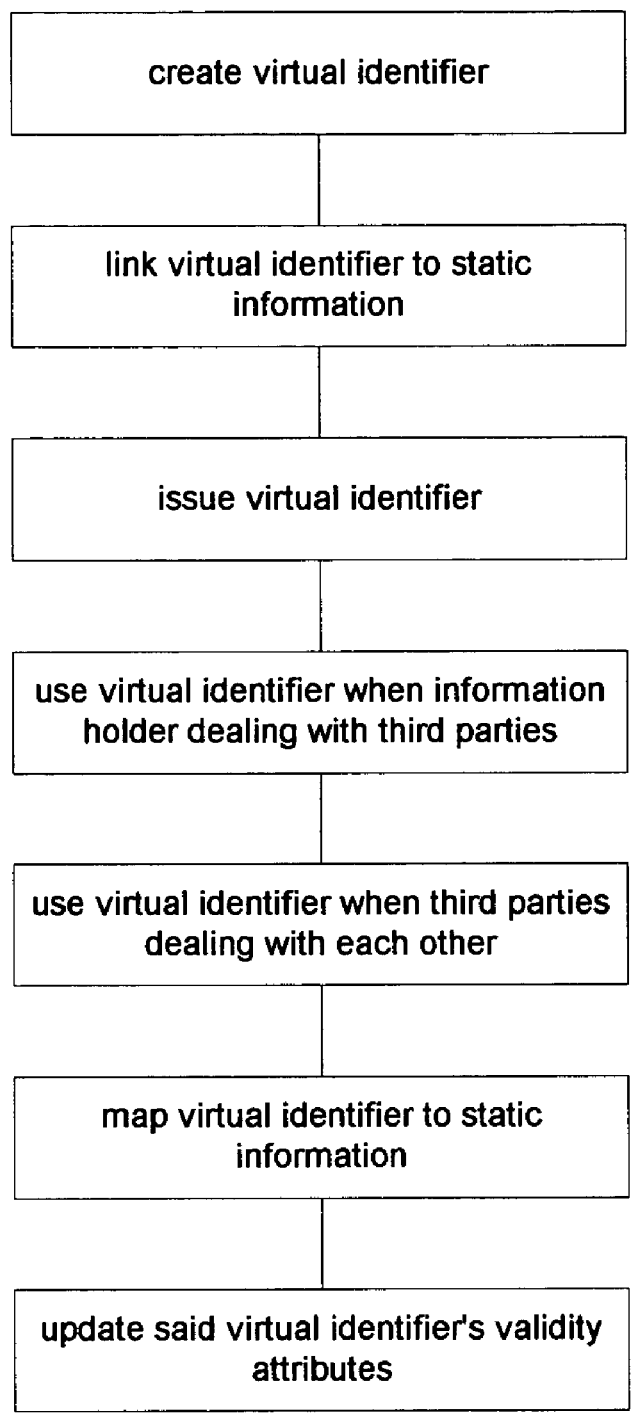
FIG. 2 is a block diagram illustrating an embodiment of the present invention.
Figure 3:
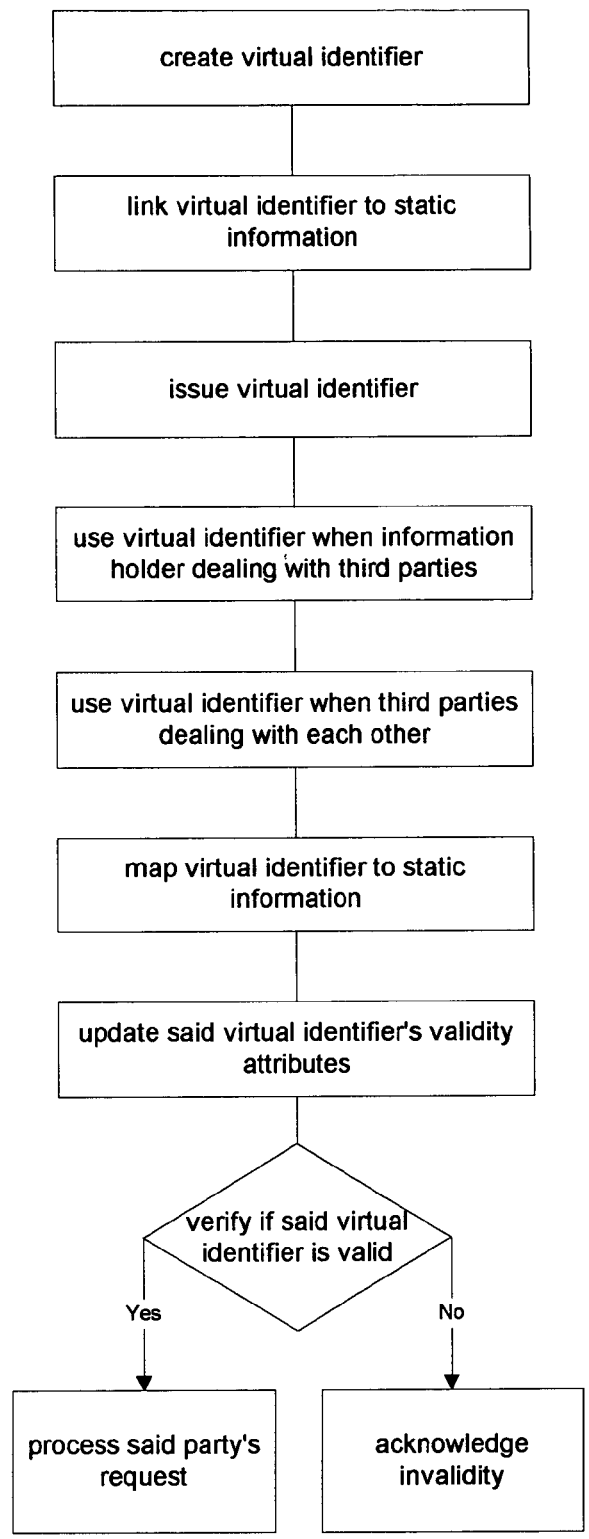
FIG. 3 is a block diagram illustrating an embodiment of the present invention.

FIG. 2 illustrates this variation. In FIG. 3, the step of verifying the virtual identifiers after they are submitted to the processing entity is added.

Figure 4:
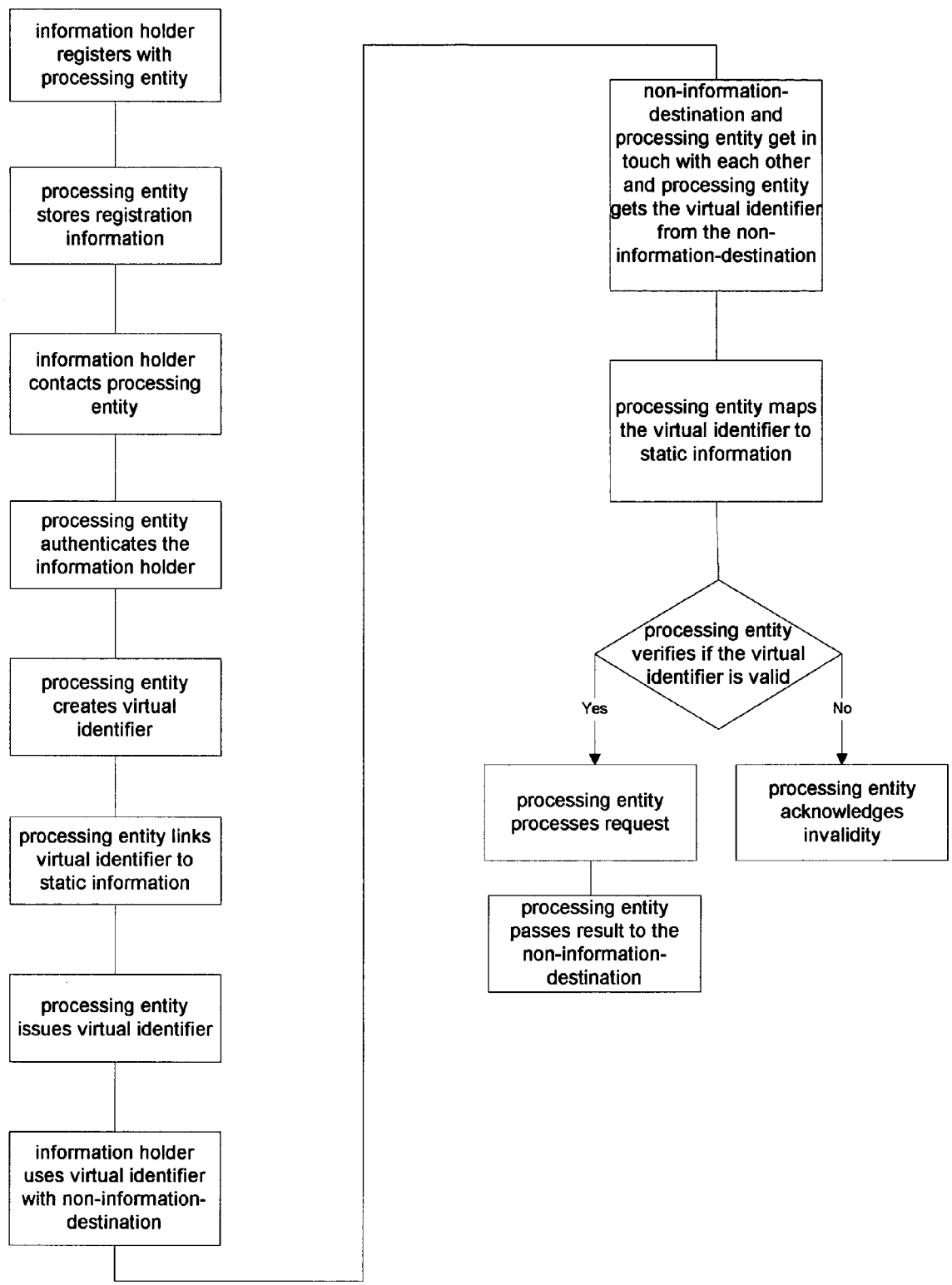
FIG. 4 is a flow diagram illustrating an embodiment of the present invention.

FIG. 4 is a flowchart illustrating the general steps of an embodiment. An information holder registers with a processing entity. The processing entity stores the information in a computer system using data management mechanisms such as database systems. For security purpose, the information can be encrypted by the processing entity before being stored. Then each time when the information holder needs a virtual identifier, he/she/it contacts the processing entity through a device that is connected to a network, a telephone or mail. The processing entity authenticates the user (user is used interchangeably with information holder through out the Specification) through an authentication protocol, such as a user id and password pair. If the authentication is successful, the user is prompted to input the validity terms as the validity attributes for the virtual identifier. For example, the user can specify that the virtual identifier is valid for only one-time use within the current week. The processing entity then creates a virtual identifier that can uniquely identify the user. The processing entity links the virtual identifier to the static identity information through data management mechanisms such as database systems. The processing entity issues the virtual identifier to a third party specified by the user or to the user. In the latter case, the user can then give this virtual identifier to a non-information-destination entity in a process. Then the non-information-destination gets in touch with the processing entity and requests for service. The non-information-destination gives the virtual identifier to the processing entity. The processing entity maps the virtual identifier to the static identity information. The processing entity verifies, based on the validity information, if the virtual identifier is valid. If it is valid, the processing entity processes the request, which may mean using the static identity information to contact an information source to get information. Then the non-information-destination is given the result. Depending on how the virtual identifier's validity was specified, the processing entity changes the status of the virtual identifier after each use of it.

Figure 5:
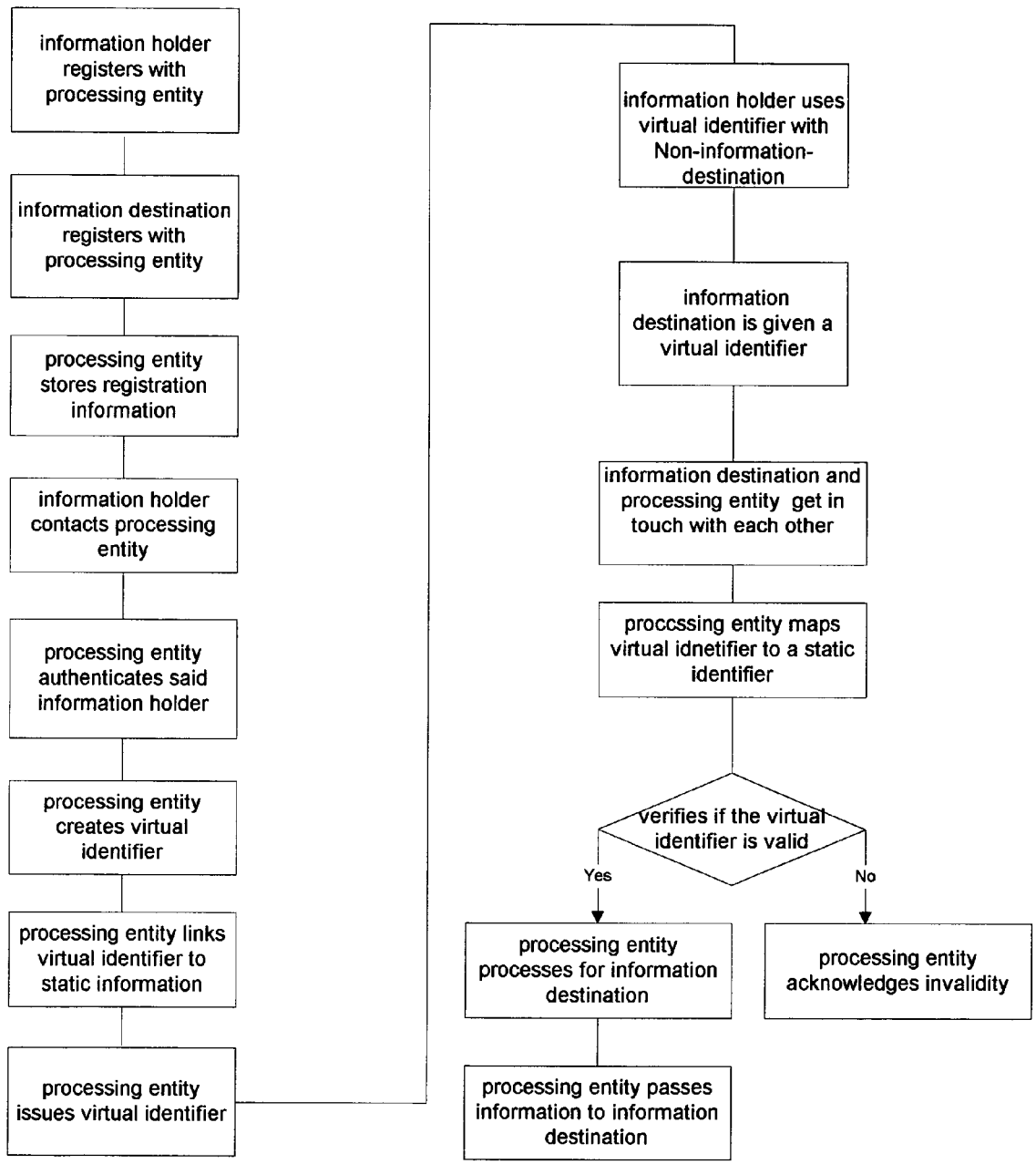
FIG. 5 is a flow diagram illustrating an embodiment of the present invention.

FIG. 5 is a flowchart of another embodiment of this invention. In this embodiment, the non-information-destination entity gives a virtual identifier to an information destination. Then the information destination and the processing entity get in touch with each other. The processing entity maps the virtual identifier to the static identity and checks if the virtual identifier is valid. If it is valid, then the processing entity processes for the information destination, which could include using the static identity information to get information from an information source. The processing entity and the information source could be the same entity.

Figure 6:
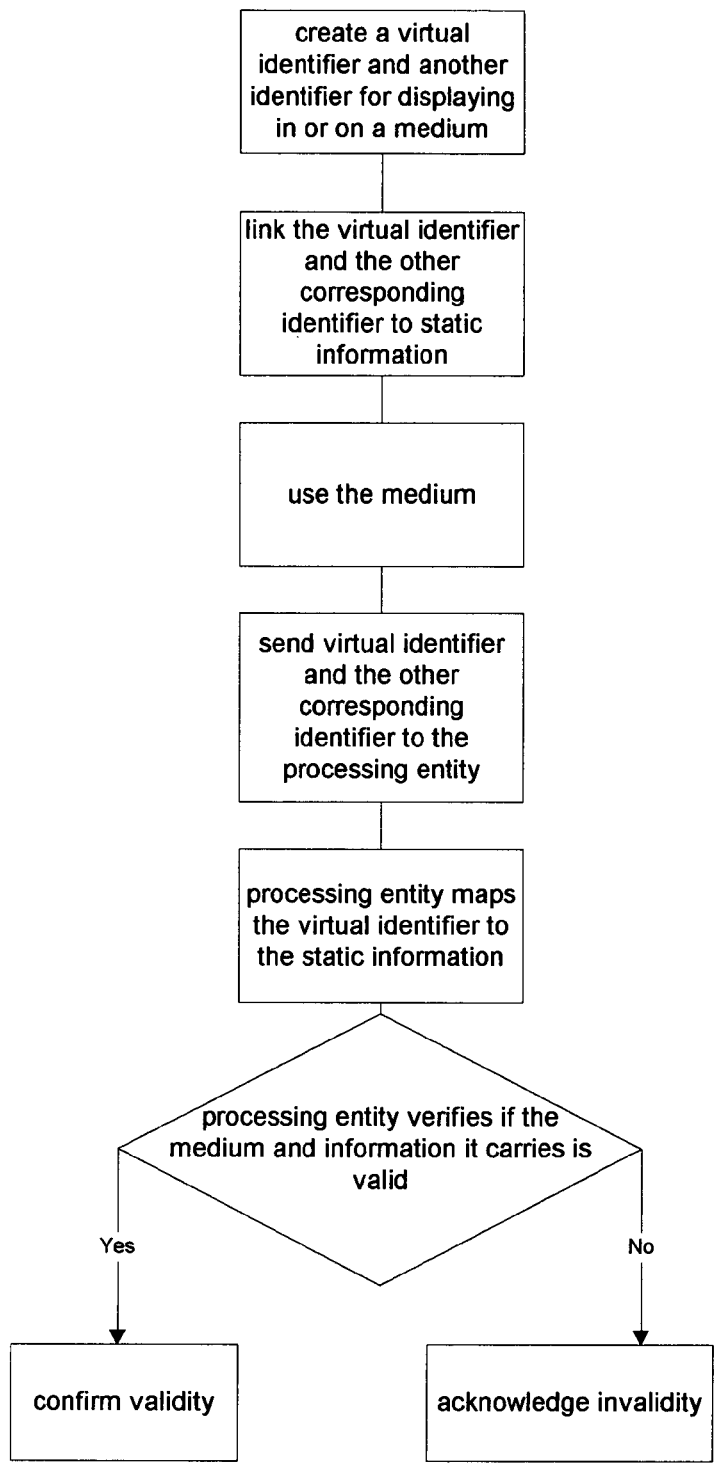
FIG. 6 is a flow diagram illustrating an embodiment of the present invention in which a virtual identifier is displayed in or on a medium.

FIG. 6 is a flowchart of another embodiment of this invention. It is a method of preventing forgery. A processing entity creates virtual identifiers and links them to the static identity information using data management mechanisms such as a database system. Each virtual identifier contains a part that is randomly generated by a random number generation function or procedure. The virtual identifiers and the validity attributes are stored in a database system. Then the virtual identifiers are displayed in or on a medium. In each use of such a medium, the virtual identifier is collected by the processing entity. The processing entity checks if the virtual identifier is valid based on the validity terms of the virtual identifier. A variation of this embodiment is to include another identifier in or on the medium. A processing entity creates virtual identifiers and another corresponding identifier for each of the virtual identifier and links them to the static identity information using data management mechanisms such as a database system. Each virtual identifier contains a part that is randomly generated by a random number generation function or procedure. The virtual identifiers, their corresponding other identifiers and the validity attributes are stored in a database system. Then the virtual identifiers and their corresponding other identifiers are displayed in or on a medium. In each use of such a medium, the virtual identifier and the corresponding other identifier are collected by the processing entity. The processing entity maps the virtual identifier to the static identity information and checks if the virtual identifier matches the corresponding identifier based on the stored information. It also checks if the virtual identifier is valid based on the validity terms of the virtual identifier.

Figure 7:
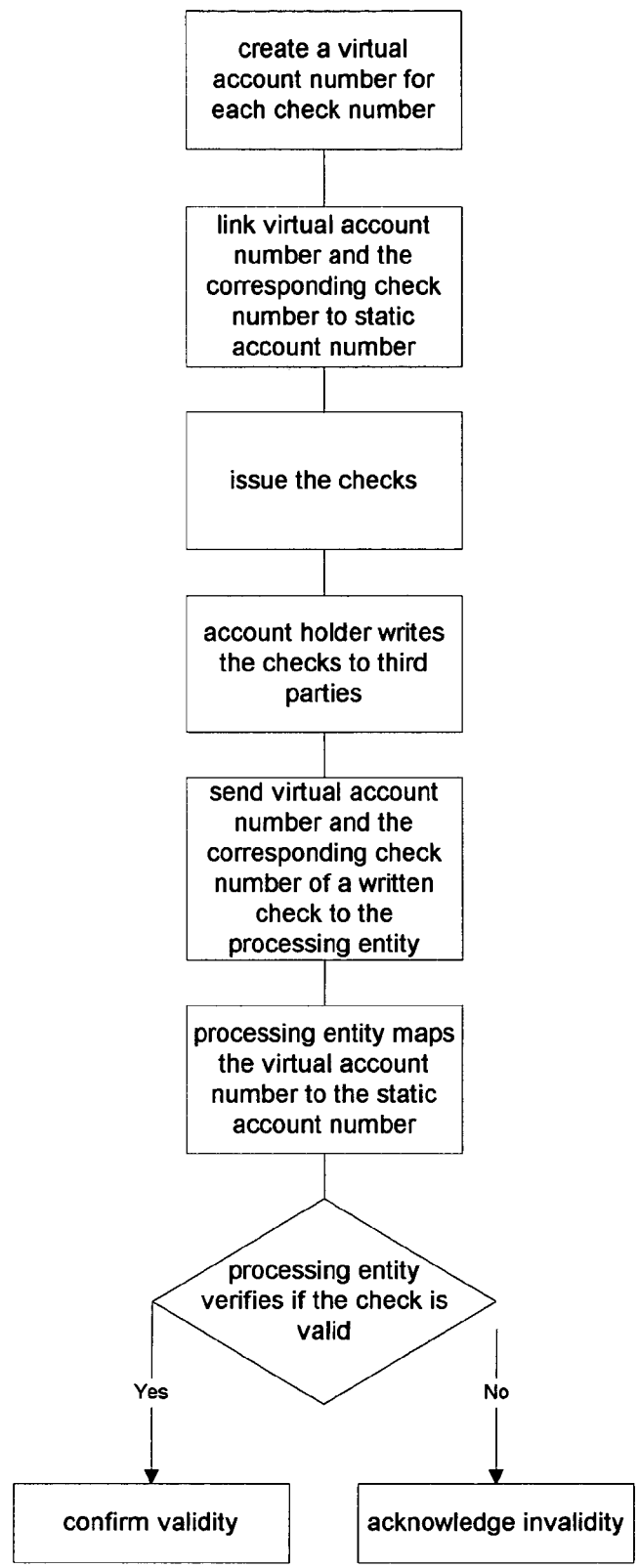
FIG. 7 is a flow diagram illustrating an embodiment of the present invention in which a virtual identifier is a virtual account number and its corresponding identifier is a check number.

FIG. 7 is a flowchart of another embodiment of this invention. It is a method of protecting account numbers against collection and fraud when checks are used. It also makes it easy to detect a faked check. The account holder requests for checks through a network connected communication device, e.g. a client computer that has Internet access, a telephone, mail service or in person. A processing entity creates virtual account numbers and links them to the static account number using data management mechanisms such as a database system. The default validity term for the virtual account numbers could be that each virtual account number is valid for one time for cashing and for the time periods specified by the financial institute for tracking, automatic-drafting, etc. Each virtual account number contains a part that is randomly generated by a random number generation function or procedure. The virtual account numbers, their corresponding check numbers and the validity terms are stored in a database system. Then the virtual account numbers and their corresponding check numbers are printed on checks. Each check uses a different virtual account number. Then the checks are issued to the account holder. The account holder uses the checks the way it is done now. In each use, the virtual account number and the corresponding check number of a written check are collected by the processing entity. The processing entity maps the virtual account number to the static account number and checks if the virtual account number matches the check number based on the stored information. It also checks if the virtual account number is valid based on the validity terms of the virtual account number. If it is valid, a validity confirmation is sent to the requesting party. If it is invalid, an invalidity acknowledgement is sent to the requesting party. A variation of this method is to include the static account number in a virtual account number. In that case, the static account number is not protected from being disclosed. However, it prevents forged checks from being cashed.

Figure 8:
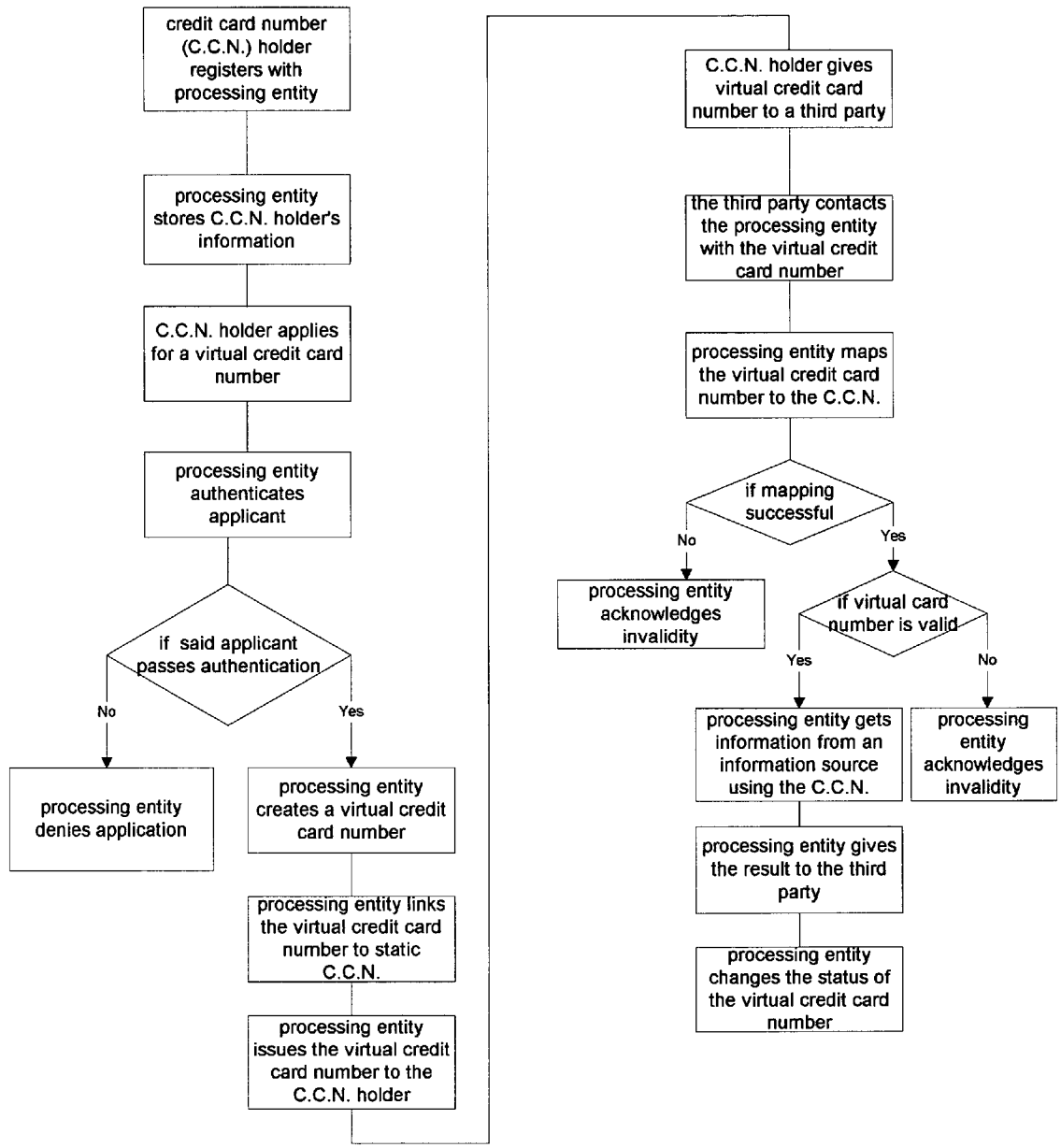
FIG. 8 is a flow diagram illustrating an embodiment of the present invention in which a virtual identifier is a virtual credit card number.

The following embodiment of this invention is a method of protecting credit card numbers. FIG. 8 is a flowchart illustrating this method. A processing entity creates virtual credit card numbers for a credit card holder. Then the processing entity issues the virtual credit card numbers to the credit card holder through a medium such as a coupon book. The credit card holder uses the virtual credit card number with third parties. The third parties treated the virtual credit card numbers the same way as they treat the static credit card number currently. The processing entity maps the virtual credit card numbers to the static credit card number. In a variation of this embodiment, a credit card holder registers with a processing entity. This is done through a device connected to an electronic network, a telecommunication device, such as a telephone, or mail. The processing entity stores the information securely in a database system. A user id and password are created during registration. The credit card holder can then contact the processing entity through a device connected to a network, or a telecommunication device, to get virtual credit card numbers. After an authentication procedure, i.e. verifying the user's id and password, the processing entity prompts the user to specify the validity terms of a virtual credit card number. The processing entity then creates the virtual credit card number and links it to the static credit card number, and then issues the virtual card number to the user. The credit card holder can then use the virtual credit card number when dealing with a goods or services provider. The provider submits the transaction with the virtual card number to the processing entity. The processing entity maps the virtual credit card number to the static credit card number through a database system and checks the validity of the virtual credit card number that is being submitted. If the virtual credit card number is valid, the processing entity attaches the static credit card information to the transaction and submits the transaction to the credit card approval network or credit card issuer. The processing entity gets the approval result and passes it to the goods or services provider. A credit card refund can be processed in the same way. The services or goods provider submits the refund transaction with the virtual card number to the processing entity. If the processing entity determines that this is a refund and the virtual card number is valid for tracking, it attaches the static credit card number to the transaction and submits the transaction to the credit card approval network or credit card issuer. The processing entity then passes the confirmation result to the provider. A virtual credit card number can be valid for only one day and only for one purchasing, but it can be valid for tracking or automatic billing, etc. for a much longer term, such as three years or longer. A credit card issuer could be a processing entity. Virtual credit card numbers can also be printed on coupon books and be issued to the credit card holder.

Figure 9:
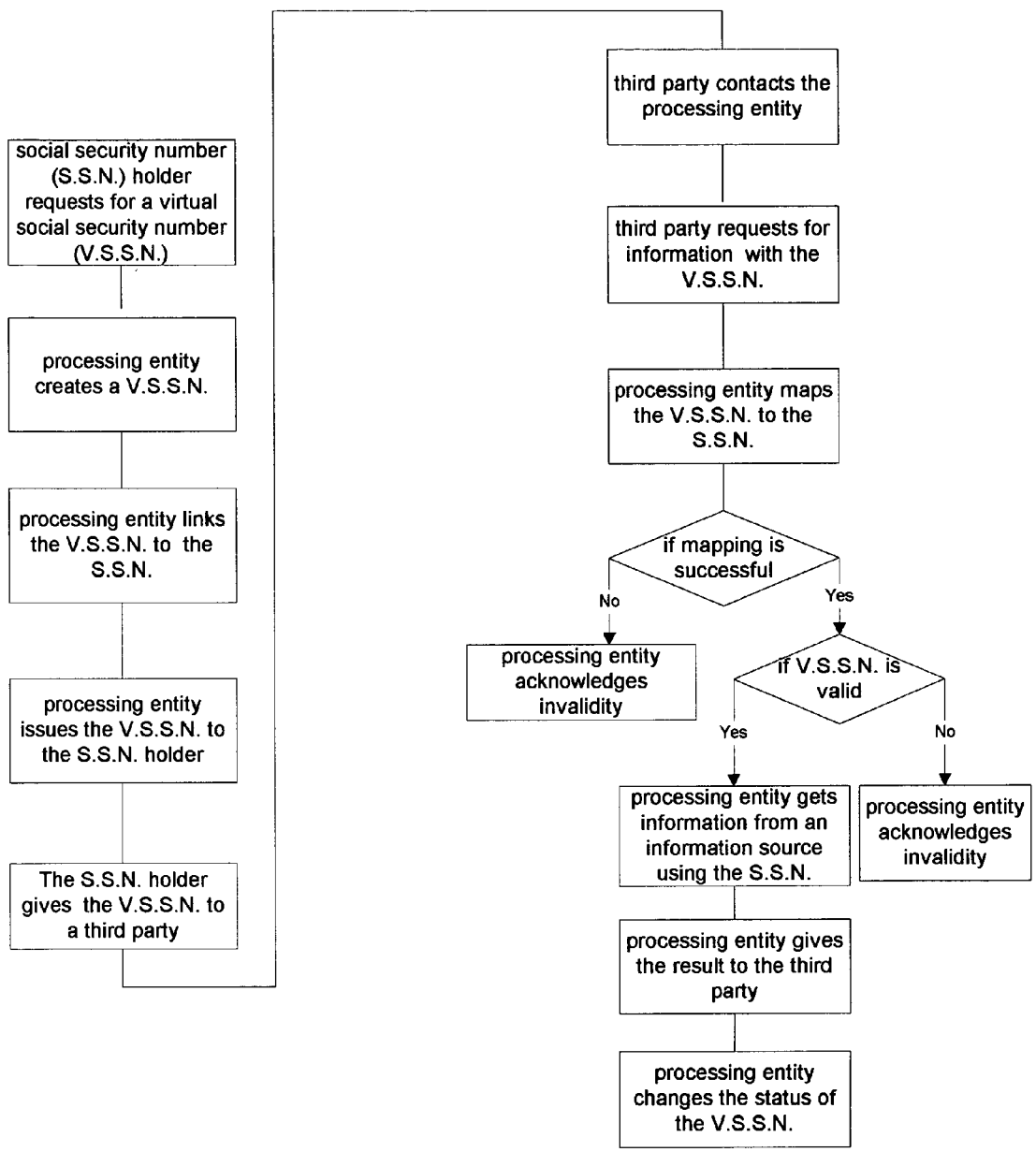
FIG. 9 is a flow diagram illustrating an embodiment of the present invention in which a virtual identifier is a virtual social security number.

Another embodiment of this invention is a method of protecting social security numbers. FIG. 9 illustrates this method. In this method, a social security number holder requests for a virtual social security number from a processing entity through a device connected to a network or a telephone. The processing entity prompts the user to select validity terms and creates a virtual social security number. The processing entity links the virtual social security number to the static social security number along with the validity terms. The processing entity then issues the virtual social security number to the user. The user uses a virtual social security number when dealing with a third party, particularly a non-information-destination entity. When a third party needs to get information about the social security number holder, the third party submits the virtual social security number to the processing entity. The processing entity maps the virtual social security number to the static social security number through a database system and determines the validity of the virtual social security number. If it is valid, the processing entity gets the results and passes them to the third party, without disclosing the static social security number. On the other hand, a third party can report to an information source through a processing entity using a virtual social security number. The processing entity maps the virtual social security number to the static social security number, attaches the static social security number to the report, and then passes it to the information source through a network connection. Or the third party could report to an information source directly with the virtual social security number. The information source then could map the virtual social security number to the static social security number through the processing entity. The processing entity could also create and issue virtual social security numbers to a social security holder without the social security holder's request.

Figure 10:
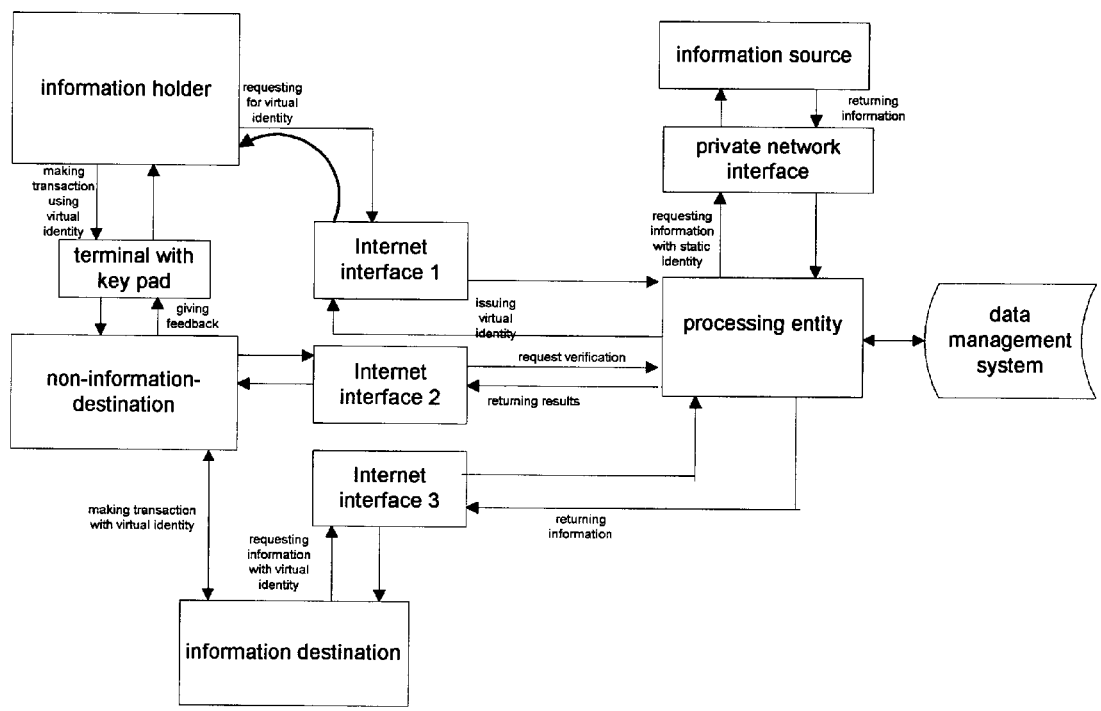
FIG. 10 is a block diagram illustrating the components of a computer system using the method presented in the present invention.

FIG. 10 illustrates the components of an embodiment of this invention. The communication component communicates with the data management system. The first user interface and the second user interface communicate with the communication component. The first user interface collects the user's information and requirements for virtual identifiers that is to be created. The communication component gets the information collected by the first user interface and has it stored through the data management system. The second user interface collects requests for virtual identifier processing and passes the requests to the communication component. The communication component gets data from the data management system and processes the requests accordingly. Multiple user interfaces could be used to communicate with different parties. Also one user interface could be used to communicate with all the parties.

Many embodiments of this invention comprise all or some of the following processes.

Registration Process:

When registering through a computer network, such as Internet, or a telephone, an information holder is prompted to create or given a user id. Then based on the authentication protocol used by the processing entity, the information holder needs at least another element for an authenticated handshake with the processing entity when requesting for virtual identifiers in the future. For example, if the authentication protocol uses a user id and password pair to verify a user, the information holder needs a password. If the authentication procedure uses cryptographic techniques, the information holder needs encryption/decryption keys. In this Specification, we use the user id and password pair scheme. After successfully getting the user id and password, the information holder provides his/her/its static information to the processing entity. For a higher security requirement, a secure communication link is used in the registration. The processing entity securely stores the information. When registering through a mail service, the user fills out the form with static information and then mails the form to the processing entity. The processing entity creates a user id and an initial password for the user.

Request for Virtual Identifier Process:

An information holder gets in touch with a processing entity through a networked device, such as a computer, a telephone, mail or in person. When using a computer or telephone, the information holder is prompted to give input on the validity terms of the virtual identifier, e.g. the time period in which the virtual identifier can be used to get information, and how many times the virtual identifier can be used to get information from an information source or a processing entity. The processing entity can also allow the user to select a default validity setting. The processing entity stores the input and creates a virtual identifier for the information holder. The processing entity can issue the virtual identifier to the information holder or give it directly to a specified third party. Virtual identifiers with pre-specified validity attributes could be issued to the information holder through check books or coupon books without the information holder's request.

Virtual Identifier Creation Process:

An example of a virtual identifier is a string that comprises the information holder's user id, the code name of the information source, e.g. a credit card issuing company's code name or a bank's routing number. The processing entity could also create a random string and appends it to the first string and makes sure that the final string is not a string that is already being used by the information holder. The processing entity then links the virtual identifier to the static information, such as an account number. The processing entity also links the validity attributes which specify the time period during which the identifier is valid, how many times the identifier can be used to get information and other constraints to the identifier. The validity attributes could also be included in the virtual identifier string. Also validity attributes can be used to control the validity of a virtual identifier during activities such as auto-drafting, auto-billing and authorization.

Using a Virtual Identifier by an Information Holder:

An information holder discloses a virtual identifier to a third party during a process where the information holder's sensitive information is currently involved.

Using a Virtual Identifier by a Non-Information-Destination Entity:

A non-information-destination entity passes a virtual identifier along with other information to a processing entity, an information-destination entity or a non-information-destination entity.

Processing a Virtual Identifier by a Processing Entity:

A processing entity processes virtual identifiers that have been used in transactions. It could map a virtual identifier to the static identity information through a data management mechanism, such as a database system. It checks if a virtual identifier is valid for the type of the transaction. If it is valid for getting information, the processing entity gets the requested information and transfers it to the entity that needs the information. If it is valid for reporting to an information source, the processing entity sends the report data to the information source.

Communication Processes:

Communications between different entities are done through devices connected to networks including private networks and public networks such as the Internet, telephones, mail services and direct human communication. Virtual private network techniques and wireless devices can be used. Cryptographic techniques and secure links could be used for secure communication.

While several embodiments of the invention have been shown and described herein, it will be obvious to those skilled in the art that various changes and modifications can be made therein without departing from the scope of the invention as defined by the Claims.

I claim:

1. A method of obtaining a piece of an information holder's sensitive information stored in an information source computer system using a virtual identifier that corresponds to a piece of said information holder's static information, comprising:
   a) receiving from a first device of said information holder, said piece of static information of said information holder by a processing entity computer system;
   b) authenticating said information holder by said processing entity computer system using an authentication protocol and receiving validity information from said first device of said information holder or a second device of said information holder;
   c) creating said virtual identifier by said processing entity computer system;
   d) linking said virtual identifier to said information holder's static information and said validity information by a data management system;
   e) transmitting said virtual identifier from said processing entity computer system to said first device of said information holder, said second device of said information holder or a third device of said information holder;
   f) receiving by said processing entity computer system a request for said piece of sensitive information of said information holder with said virtual identifier from a first device of a third party;
   g) identifying by said processing entity computer system said static information of said information holder using said virtual identifier;
   h) validating said virtual identifier by said processing entity computer system using said validity information;
   i) transmitting a request for obtaining said piece of sensitive information of said information holder to said information source computer system by said processing entity computer system;
   j) receiving said piece of sensitive information of said information holder from said information source computer system in response to said request for obtaining said piece of sensitive information;
   k) transmitting said piece of sensitive information of said information holder to said first device of said third party or a second device of said third party from said processing entity computer system.

2. The claim as recited in claim 1 further comprising:
   receiving a request for said virtual identifier from said information holder by said processing entity computer system.

3. The method as recited in claim 2, further comprising:
   updating said virtual identifier's validity status by said processing entity computer system.

4. The method as recited in claim 3, further comprising:
   receiving said information holder's registration information and issuing a user ID to said information holder by said processing entity computer system.

5. The method as recited in claim 1, wherein said third party is the first party requesting for said piece of sensitive information and said third party has submitted said request for said piece of sensitive information to said processing entity computer system.

6. The method as recited in claim 5, wherein step g) is conducted through mapping said virtual identifier to said static information by said processing entity computer system.

7. The method as recited in claim 6, wherein said piece of static information comprises a social security number.

8. The method as recited in claim 6, wherein said validity information comprises specification on the time period in which said virtual identifier is valid to obtain information.

9. The method as recited in claim 6, wherein said validity information comprises specification on the number of times said virtual identifier being valid to obtain information.

10. The method as recited in claim 6, wherein said virtual identifier is valid for multiple-time or one-time for requesting for sensitive information of said information holder.

11. The method as recited in claim 5 wherein said virtual identifier comprises a field of a randomly generated string.

12. The method as recited in claim 5, wherein step e) is conducted through a public network.

13. The method as recited in claim 5, wherein step f) is conducted through a public network.

14. The method as recited in claim 13 wherein said public network is the Internet.

15. The method as recited in claim 5, wherein said virtual identifier comprises validity attributes.

16. The method as recited in claim 5, wherein said virtual identifier comprises a field that identifies said information holder.

17. The method as recited in claim 5, wherein said virtual identifier comprises a field that indicates information sources.

18. A method of obtaining a piece of an information holder's sensitive information stored in an information destination computer system using a virtual identifier that corresponds to a piece of said information holder's static information, comprising:
   a) receiving from a first device of said information holder, said piece of static information of said information holder by a processing entity computer system;
   b) authenticating said information holder by said processing entity computer system using an authentication protocol and receiving validity information from said first device of said information holder or a second device of said information holder;
   c) creating said virtual identifier by said processing entity computer system;
   d) linking said virtual identifier to said information holder's static information and said validity information by a data management system;
   e) transmitting said virtual identifier from said processing entity computer system to said first device of said information holder, said second device of said information holder or a third device of said information holder;
   f) receiving by said information destination computer system a request for said piece of sensitive information of said information holder with said virtual identifier from a third party device;
   g) receiving by said processing entity computer system a request for said piece of static information of said information holder with said virtual identifier from said information destination computer system;
   h) identifying by said processing entity computer system said static information of said information holder using said virtual identifier;
   i) validating said virtual identifier by said processing entity computer system using said validity information;
   j) transmitting said piece of static information of said information holder from said processing entity computer system to said information destination computer system.

\* \* \* \* \*